US006472596B1

(12) United States Patent
DeBartolo et al.

(10) Patent No.: US 6,472,596 B1
(45) Date of Patent: Oct. 29, 2002

(54) COUPLING MECHANISM FOR AN ELECTRICAL FITTING INCLUDING ENERGY ABSORBING SELF-RETURNING SNAPS

(75) Inventors: Joseph V. DeBartolo, North Stonington, CT (US); Sorin I. Mortun, Irvington, NY (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/894,825

(22) Filed: Jun. 29, 2001

(51) Int. Cl.[7] ................................................. H02G 3/04
(52) U.S. Cl. .......................... 174/48; 174/50; 174/60; 220/3.2; 220/3.3
(58) Field of Search ........................ 174/48, 49, 50, 174/60, 67, 68.3; 220/3.2, 3.3, 3.4, 3.5, 3.6, 3.7, 3.8, 3.9, 4.01, 4.02; 52/220.1, 220.3, 220.5, 220.7

(56) References Cited

U.S. PATENT DOCUMENTS

| | | | | |
|---|---|---|---|---|
| 4,504,698 A | * | 3/1985 | Greenwood ................. | 174/48 |
| 4,797,507 A | | 1/1989 | Lofving ...................... | 174/48 |
| 4,896,784 A | * | 1/1990 | Heath ......................... | 220/3.2 |
| 5,274,194 A | * | 12/1993 | Belcher ....................... | 174/50 |
| 5,300,731 A | | 4/1994 | DeBartolo, Jr. et al. ...... | 174/48 |
| 5,358,135 A | * | 10/1994 | Robbins et al. ............. | 220/326 |
| 5,370,551 A | * | 12/1994 | Data .......................... | 220/3.8 |
| 5,383,098 A | * | 1/1995 | Ma et al. .................... | 174/35 R |
| 5,549,039 A | * | 8/1996 | Ito et al. ..................... | 16/383 |
| 5,747,733 A | | 5/1998 | Woods et al. ................ | 174/48 |
| 5,863,016 A | | 1/1999 | Makwinski et al. ......... | 248/27.1 |
| 5,944,561 A | * | 8/1999 | McCleerey et al. ......... | 220/844 |
| 6,177,633 B1 | * | 1/2001 | Gretz ......................... | 174/153 G |
| 6,188,018 B1 | | 2/2001 | Benito-Navazo ............ | 174/48 |
| 6,198,043 B1 | * | 3/2001 | Hoffmann ................... | 174/48 |
| 6,262,365 B1 | * | 7/2001 | Ewer .......................... | 174/48 |
| 6,342,675 B1 | * | 1/2002 | DeBartolo et al. .......... | 174/49 |
| 6,348,657 B1 | * | 2/2002 | Haslock et al. ............. | 174/153 G |

* cited by examiner

*Primary Examiner*—Dean A. Reichard
*Assistant Examiner*—Angel R. Estrada
(74) *Attorney, Agent, or Firm*—Jeffrey J. Howell; Mark S. Bicks; Alfred N. Goodman

(57) ABSTRACT

A raceway fitting, including a first housing portion having a bottom surface, a first wall and a second wall, and a first coupling member adjacent said first wall. The first coupling member has a tapered surface with first and second ends, the tapered surface extending from an obtuse angle from the first wall. The adapter assembly further has a second housing portion with a first side portion and a second side portion. A second coupling member is located on the first side portion, the second coupling member having a first edge and a second edge. When coupling the first housing portion to the second housing portion, the first edge of the second coupling member engages the tapered surface of the first coupling member, adjacent the first edge and traverses the tapered surface in the direction of the second end, to facilitate the coupling thereof. This allows the two housing portions to be easily assembled and also allows the assembly to withstand an impact to the housing without the housing portions uncoupling.

19 Claims, 4 Drawing Sheets

COUPLING MECHANISM FOR AN ELECTRICAL FITTING INCLUDING ENERGY ABSORBING SELF-RETURNING SNAPS

FIELD OF INVENTION

The present invention relates to a raceway fitting for introducing a conduit, electrical wiring or the like into a duct or raceway of a surface mounted duct system. More specifically, the invention relates to a conduit adapter assembly having a base and a cover detachably coupled to each other by snap-fitting complementary parts. The base has a reverse taper on the receiving area for the snap portions on the cover, which acts as a cam to return the fitting or box cover to its original position, when the cover is dislodged due to an outside force or impact.

BACKGROUND OF INVENTION

Surface mounted duct systems for enclosing conduit, electrical wiring and the like are known. A typical duct system includes a plurality of raceway runs, some of which are joined at various locations by junction enclosures. The precise configuration of each duct system, including the raceway sizes, lengths and locations, and the number and type of junction enclosures, is determined by site-specific wiring layouts. Sometimes, one or more junction enclosures are used to introduce the conduit into one of the raceway runs of the duct system.

Enclosures serving as junctions and/or conduit adapters must cooperate with their corresponding raceways to completely conceal and protect the conduit running therethrough. At the same time, the enclosures and raceways must present an aesthetically pleasing appearance since the entire duct system is typically mounted on an exposed surface. To maintain an aesthetically pleasing appearance, duct systems have employed tight-fitting connections between raceways and junction enclosures and between the separate portions of the junction enclosures.

Additionally, the connections between the portions of the junction enclosures must stay coupled together during a low temperature impact test. Many of the conventional raceway covers separate during this test, resulting in failure of the cover. One conventional method to resolve this problem is to increase the components' wall thicknesses, which creates more spring resistance. Another conventional method is to deepen the snap engagement, which results in more resistance force. These modifications make assembly difficult and add cost of materials to the production.

Examples of prior art raceways and junctions include U.S. Pat. No. 6,188,018 to Benito-Navazo; U.S. Pat. No. 5,747,733 to Woods; and U.S. Pat. No. 5,300,731 to DeBartolo, Jr. et al., each of which is herein incorporated by reference.

Thus, there exists a need to provide an improved conduit adapter assembly, which can pass a low temperature impact test.

SUMMARY OF INVENTION

Accordingly, a primary object of the present invention is to provide a raceway fitting capable of introducing a conduit into a raceway of a duct system.

Another object of the present invention is to provide a raceway fitting capable of forming a junction between different runs of raceway or duct.

Another object of the present invention is to provide a raceway fitting capable of passing a low temperature impact test.

Another object of the present invention is to provide a raceway fitting capable of recoupling a housing cover to a base after a low temperature impact test and avoiding uncoupling thereof.

Still another object of the present invention is to provide a raceway fitting capable of recoupling a housing cover to a base after a low temperature impact test using a tapered portion on at least one portion of the housing and avoiding uncoupling thereof.

Yet another object of the present invention is to provide an enclosure for a duct system that is relatively simple in construction and cost effective to produce.

The foregoing objects are basically obtained by providing a raceway fitting, including a first housing portion having a base, a first wall and a second wall and a first coupling member on the first wall. The first coupling member has a tapered surface with first and second ends, the tapered surface extending from an obtuse angle from the first wall. The assembly further has a second housing portion with a first side portion and a second side portion, a second coupling member on the first side portion, the second coupling member having a first edge and a second edge. When coupling the first and second housings portions together, the first edge of the second coupling member engages the tapered surface of the first coupling member, adjacent the first end and traverses the tapered surface in the direction of the second end, to facilitate the coupling thereof.

Other objects, advantages and salient features of the invention will become apparent from the following detailed description which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF PREFERRED EMBODIMENTS

Figure 1:
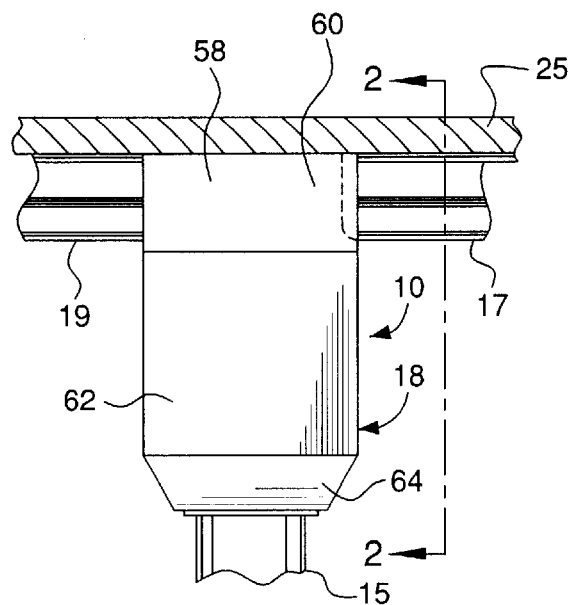
FIG. 1 is a top elevational view of a conduit adapter assembly according to a preferred embodiment of the present invention, attached to a vertical wall surface and a ceiling surface.
Figure 2:
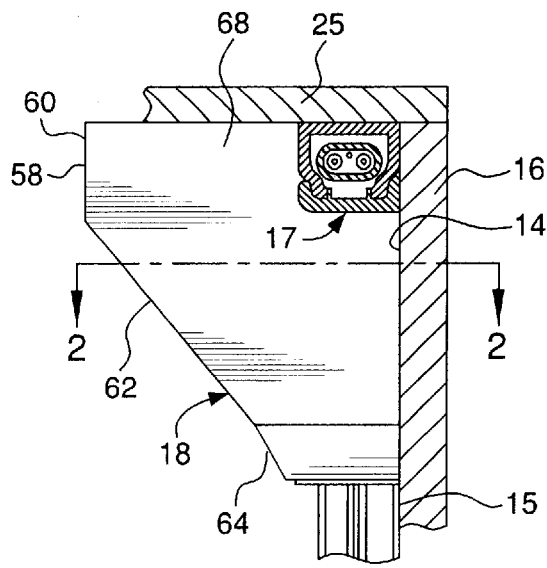
FIG. 2 is a side elevational view in cross-section of the conduit assembly of FIG. 1, taken along lines 2—2.
Figure 3:
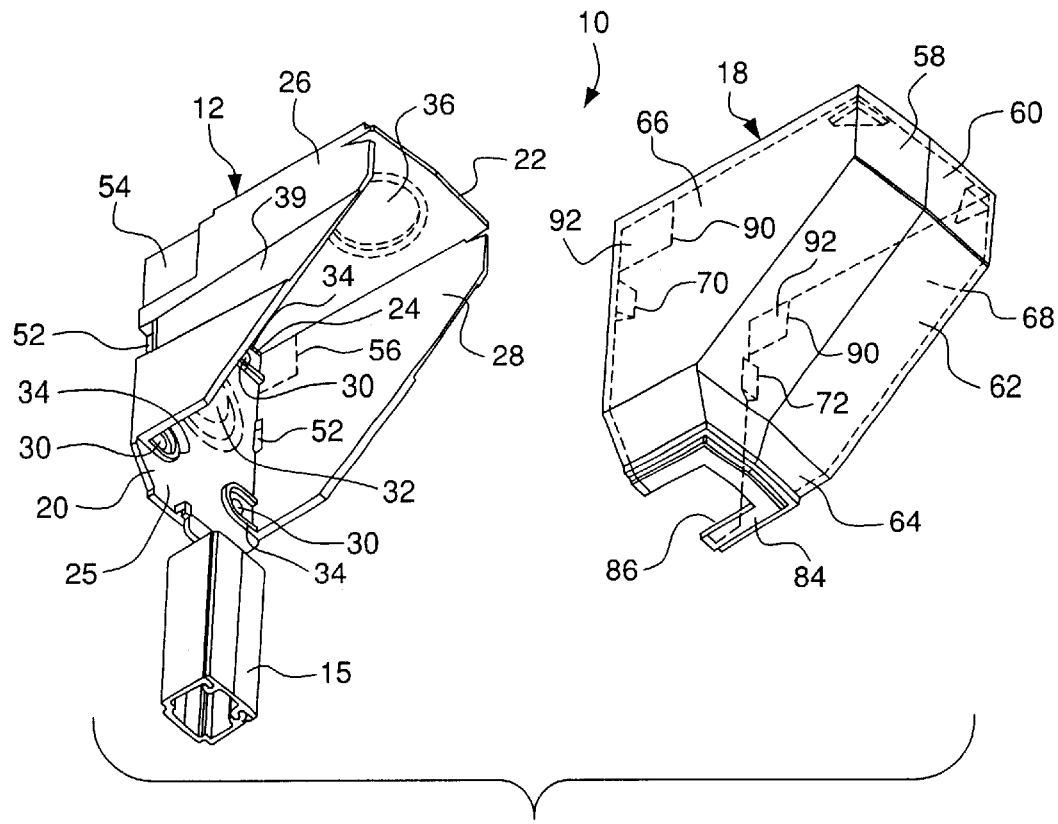
FIG. 3 is an exploded bottom perspective view of the conduit adapter assembly of FIG. 1 except only one line conduit inserted therein.

Referring initially to FIGS. 1–3, a raceway fitting or conduit adapter assembly 10 is illustrated in accordance with the present invention, and includes a first housing portion or base 12 attachable to a mounting surface 14 of a vertical wall 16, and a second housing portion or cover 18 releasably coupled to base 12. Adapter assembly 10 can be used for up to three ducts 15, 17 and 19.

As particularly seen in FIGS. 1–3, the base 12 is preferably formed from a resilient plastic material and includes a bottom wall or surface 20 with first and second ends 24 and 25, respectively, and is adapted to be coupled to wall 16. An end wall 22 extends substantially perpendicular from the end 24 of bottom wall 20 to abut against ceiling 27, and a pair of substantially parallel, opposite side walls 26 and 28 extend between and substantially perpendicular to bottom wall 20 and end wall 22.

The bottom wall 20 is a substantially flat, rectangular plate with four mounting openings 30, one located in each corner of bottom wall 20. The mounting openings 30 receive mounting screws (not shown) or any other appropriate fastener for securing the base 12 to the wall 16 in a position as seen in FIGS. 1 and 2. Arcuate protrusions or ribs 34 are formed on the inner surface of the bottom wall 20 to isolate and strengthen the region or corner of the bottom wall 20 surrounding the holes 30.

A punch-out 32 is also provided in the bottom wall 20 and is defined by multiple substantially circular grooves that allow the installer or operator to choose the diameter of the hole therethrough. After forming an access hole in the wall 16, a conduit connector (not shown) can then be coupled in the opening formed by removal of punch-out 32, and a conduit can be run into the conduit adapter assembly 10 from behind the wall 16.

A second punch-out 36 is formed in the end wall 22 by multiple substantially circular grooves, in much the same way as described above for the punch-out 32. A conduit connector can then be fitted in the resulting opening to introduce electrical conduit, such as wiring, into the conduit adapter assembly 10.

The pair of parallel opposite side walls 26 and 28 extend between the end wall 22 and the bottom wall 20 so as to be mutually orthogonal therewith. The first and second side walls 26 and 28, respectively, reinforce the base 10 by bracing the end wall 22 and bottom wall 20. However, side walls 26 and 28 of base 10 are preferably slightly resilient to permit flexing thereof during coupling of base 10 to cover 18 as discussed below.

As best seen in FIGS. 3–6, the first and second walls 26 and 28 are substantially similar and therefore only wall 28 will be specifically described herein. Wall 28 has a first surface 38, a second surface 40 and an end 42 proximal to the bottom surface. Located in the first surface 38 is preferably a groove or slot 39 (FIG. 3); however, that groove is merely to help guide and facilitate coupling of the housing portions into proper alignment and is not necessary for operation of the assembly. First and second surfaces 38 and 40 are preferably substantially planar and each extends substantially perpendicular from bottom surface 20 and substantially parallel to each other. End 42 preferably consists of a surface 44 that extends substantially perpendicular from second surface 40 and a tapered end surface 46, which lies adjacent thereto. However, it not necessary to use surface 44 and end 42 may only consist of tapered surface 46, if desired. Tapered surface 46 has a first edge or end 48 and a second edge or end 50. First edge 48 is preferably located farther from the bottom surface 20 than the second edge 50 and is adjacent surface 38 and second edge 50 is adjacent second surface 40. The tapered surface 46 and surface 44 extend between first and second surfaces 38 and 40. More specifically, tapered surface 46 extends from first surface 38 at an obtuse angle, downwardly and inwardly, toward second surface 40 and bottom surface 20 and converges with surface 44, which extends to surface 40. The combination of the first surface 38, a second surface 40 and end 42 form a recess in wall 28 or first coupling portion or member 52 (FIG. 3).

The side walls 26 and 28 of the base 12 are further provided with knock out portions 54 and 56, each being positioned behind the corresponding coupling portion 52 of the base 12. A knock out portion is removed to create an opening in the base 12 for either of the second and third runs or ducts 17 or 19.

As particularly seen in FIGS. 1–3, cover 18 is preferably formed from a resilient plastic material and has a top surface 58, which is divided into first top wall portion 60, second top wall portion 62 and third top portion 64, and has side walls or portions 66 and 68. As seen specifically in FIGS. 2 and 3, first portion 60 extends substantially perpendicularly to both portions 66 and 68 and at the area in which portions 66 and 68 are their widest. Second portion 62 is adjacent portion 60 and extends at an obtuse angle thereto and perpendicular to both portions 66 and 68. Portion 62 extends in such a manner as to decrease the width of the distance of portions 66 and 68. Portion 64 is adjacent portion 62 and also extends in such manner as to decrease the width of portions 66 and 68; but also is tapered inwardly to decrease the distance between portions 66 and 68.

Figure 4:
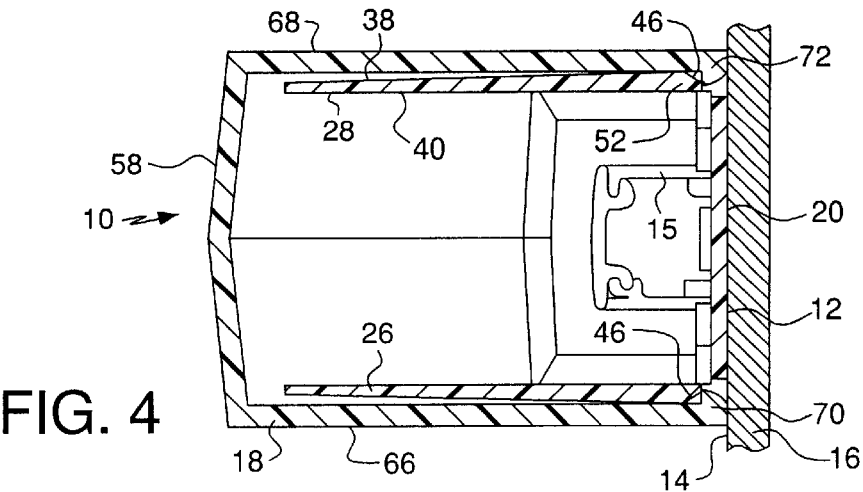
FIG. 4 is cross-sectional top view of the conduit adapter assembly of FIG. 2, taken along lines 4—4 with the cover fully coupled to the base.
Figure 5:
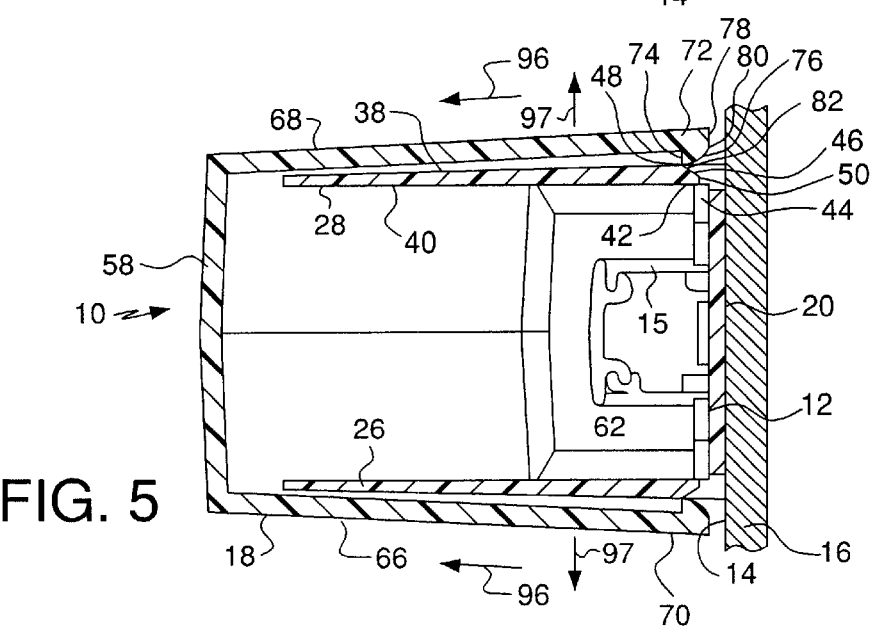
FIG. 5 is a cross-sectional top view of the conduit adapter assembly of FIG. 4, during the low temperature impact test and with the cover displaced from the base.
Figure 6:
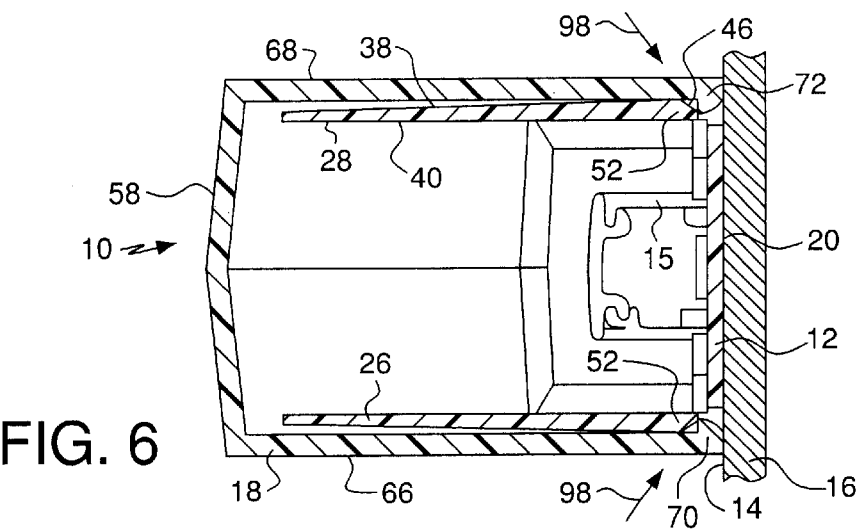
FIG. 6 is a cross-sectional top view of the conduit adapter assembly on the base of FIG. 5, after the low temperature impact test, with the cover returned to its original coupled position.
Figure 7:
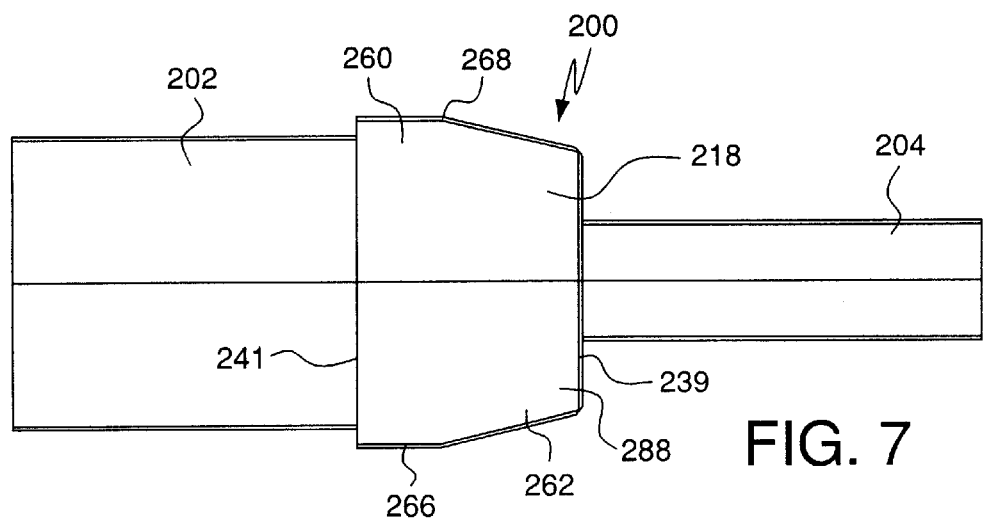
FIG. 7 is a top view of a raceway fitting according to a second embodiment of the present invention.
Figure 8:
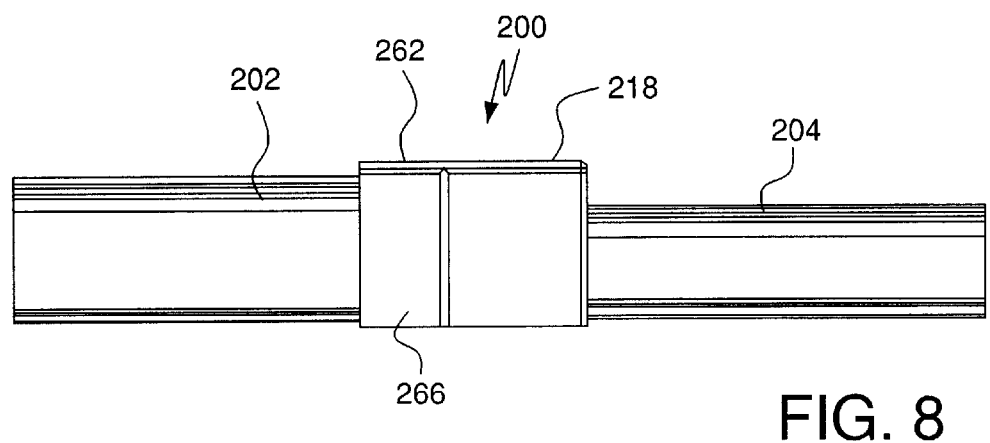
FIG. 8 is a side elevational view of the raceway fitting of FIG. 7.

Side wall portions 66 and 68 are each substantially planar and parallel to one another and have second latching members or first and second protrusions 70 and 72, respectively. As best seen in FIGS. 4–6, protrusions 70 and 72 each extend inwardly from their respective portions and have a first or coupling surface 74, a second or tapered surface 76 and a third surface 78. Since protrusions 70 and 72 are substantially similar and only protrusion 72 will be specifically described herein. First surface 74 extends substantially perpendicularly from wall portion 68 and ends at first edge or end 80. Adjacent edge 80, second surface 76 extends downwardly and away from edge 80 to second edge or end 82, forming an acute angle between first surface 74 and second surface 76. Third surface 78 extends substantially parallel to first surface 74 and from second edge 82 to wall portion 68. Third surface 78 further extends substantially perpendicular to wall potion 68.

As seen in FIG. 3, front wall 84 couples or connects side portions 66 and 68 and top portion 64 and forms a substantially U-shaped opening 86 therein. U-shaped opening 86 is dimensioned to snugly receive a first run of a surface mounted raceway or duct 15 therein.

As seen in FIG. 3, a substantially rectangular groove or seam 90 formed in the inner surface of the side walls 66 and 68 extends from the rearward edge to the bottom surface thereof. The groove 90 provides a frangible seam in the side walls for removing a twist-out portion 92. The twist-out portion 92 can be optionally removed to receive a second and/or third run of a surface mounted raceway or duct 17 or 19, as seen in FIGS. 1 and 2.

Operation of Conduit Adapter Assembly of FIGS. 1–3

As seen in FIGS. 1–3, base 12 is coupled to the surface 14 using screws (not shown) that pass through holes 30 and into wall 16. Knock-out portions 36 and 32 can be removed to pass wires into the adapter assembly if desired and conduits can be coupled to the front end 25 of the base 12 and/or through knock-out portions 54 and 56, as is known in the art.

Once the wiring and conduits are assembled and connected as desired, cover 18 can be coupled to base 12. As seen in FIGS. 4–6, cover 18 is moved in the direction of base 12 and preferably protrusions 70 and 72 engage walls 26 and 28, respectively. The protrusions specifically engage grooves 39, which helps to direct the cover into proper alignment and the protrusions 70 and 72 into the latching members 52.

Furthermore, the walls 66 and 68 of the cover are formed so that they are resilient and have a natural tendency to extend substantially perpendicularly from top surface 58, and walls 26 and 28 also are resilient and have a natural tendency to extend substantially perpendicularly from bottom surface 20. The resiliency of the walls 26 and 28 force walls 66 and 68 slightly outwardly, once the protrusions 70 and 72 engage the walls 26 and 28 (FIG. 5); however, the resiliency of walls 66 and 68 creates an inward bias that causes the protrusions to frictionally engage the grooves 39. As the protrusions 70 and 72 approach the bottom surface 20, the protrusions also approach the latching members 52.

As the protrusion approach the latching members 52, the edge 80 of each protrusion approaches and becomes adjacent to the first end 48 of the tapered surface 46. The protrusions then traverse the tapered surface 46, which is tapered downwardly and inwardly toward the bottom surface 20. Since the sides 66 and 68 are inwardly biased from the resiliency and the structure of the cover 18, the edge 80 of the protrusions are actually forced along the tapered surface toward second edge 50. Once the edge 80 of the protrusion passes second edge 50, the protrusion snaps into place and first surface 74 is engaged with surface 44 of the latching member 52.

This latching method allows easy assembly when coupling the cover and the base together. Since the device is "self snapping" less work is required and if several of the devices need to be assembled the assembly is more efficient. Additionally, this type of housing will be suitable for passing a low temperature impact test. In a low temperature impact test, the cover of the housing is generally struck with an impact device in the direction of the arrows 96 shown in FIG. 5. This impact generally causes the cover to "jump". As seen in FIG. 5, if the cover "jumps" in the direction of arrows 97, the edge of the protrusion will traverse up the tapered surface from the second end 50 to the first end 48, thereby absorbing the energy of the impact device. However, since the walls 66 and 68 of the cover 18 are biased to the normal coupled configuration or in the direction of arrows 98 (FIG. 6), as described above, the protrusion traverses back down the tapered surface in a similar fashion as to the coupling described above, and couples again with the latching member 52, as shown in FIG. 6, thus self-returning to the snapped position and avoiding a permanent uncoupling condition.

It is noted that this type of self-returning snap can be used on any resilient housing or raceway fitting and it is not necessarily limited to the herein described conduit adapter assembly housings.

This structure allows a cost efficient manner in which to manufacture a conduit assembly device. Furthermore this structure increases the ease of assembly, since the walls of the device can remain relatively thin and flexible.

Embodiment of FIGS. 7–11

As seen in FIGS. 7–11, a second embodiment for the self returning snapping mechanism is shown. Raceway or transitional fitting or housing 210 is specifically for reducing a wide two tunnel conduit 202 to a one tunnel conduit 204. Housing 210 preferably has a base 212 and a cover 218.

Base 212 is formed of a resilient material, such as plastic and has a bottom surface 220, an end wall 222 and two side walls 226 and 228. Bottom surface 220 is substantially planar and has a first end 224 and a second end 225. Bottom surface 220 is widest at second end 225 and tapers inwardly from second end 225 toward first end 224. Notches or grooves 206 form substantially rectangular indentations in bottom surface 220. The indentations have a first edge or inner wall 221 and a second edge or inner wall 223 and define protrusions 227 and 229 at the first end 224 and the second end 225 of the bottom surface 220, respectively. Furthermore, bottom surface 220 has an aperture 271 therethrough for a screw that can couple the base to the raceway if desired.

End wall 222 is substantially planar and substantially perpendicular to bottom surface 220 and coupled thereto at second end 225 of bottom surface 220. As seen specifically in FIGS. 9-11, adjacent end wall 222 on bottom surface 220 is a groove 231. Groove 231 along with groove 233 on the surface on end wall 222 (FIG. 10) allows the end wall 222 to be removed entirely or just a portion thereof for passing wires from a raceway to the fitting, as is known to one skilled in the art.

Side walls 226 and 228 are substantially planar and extend substantially perpendicularly from bottom surface 220. As seen specifically in FIG. 10, each side wall has a notch 235 adjacent the bottom surface 220. Notches 235 coincide with notches 206 in the bottom surface and form two second latching portions or coupling members 237 on the bottom portion and each adjacent side wall.

Cover 218 is preferably a resilient material, such as plastic, and has first end 239 and second end 241, a substantially planar top surface 258 and first and second substantially planar walls or portions 266 and 268, respectively. Top surface 258 has a first portion 260 and a second portion 262. The first portion is substantially rectangular in area, while second portion has an inwardly tapered portion that reduces the width of the top portion, as seen specifically in FIG. 7. Each wall portion 266 and 268 extends substantially perpendicular from top surface 258 and follows the tapered second portion inwardly. The first end 239 of the cover has a front wall 243 that extends perpendicularly therefrom and has a U-shaped opening. The U-shaped opening in generally is used to pass a conduit 204 into the interior of the housing 210.

Figure 9:
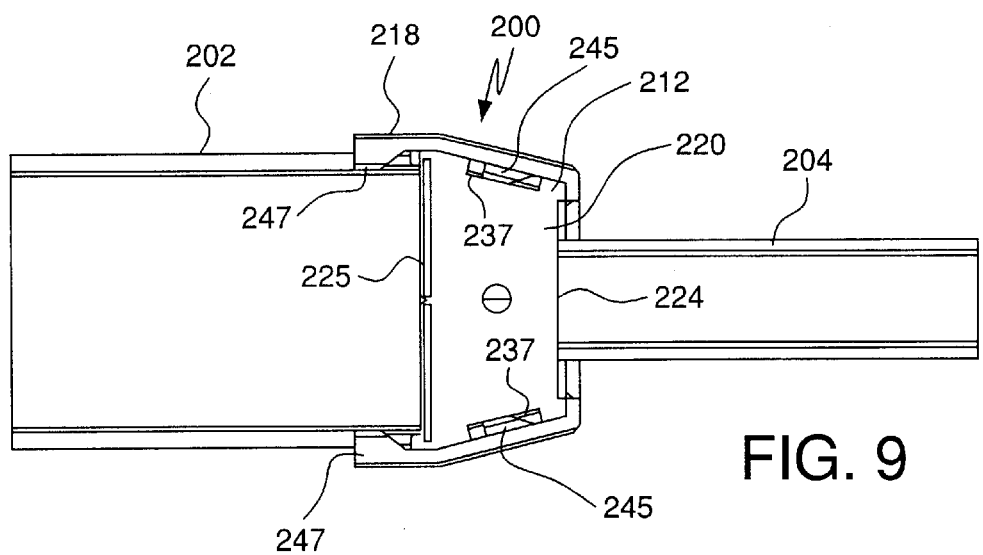
FIG. 9 is a bottom view of the raceway fitting of FIG. 8.
Figure 10:
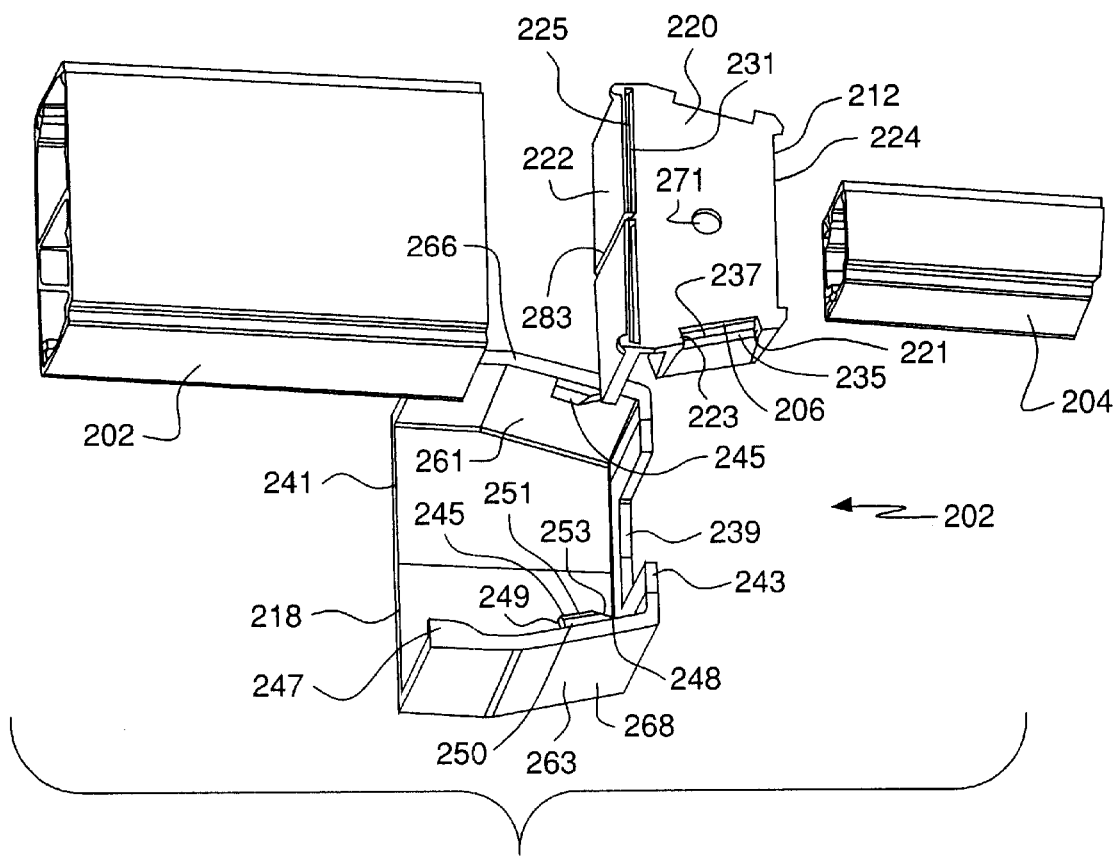
FIG. 10 is an exploded bottom perspective view of the raceway fitting of FIG. 9.
Figure 11:
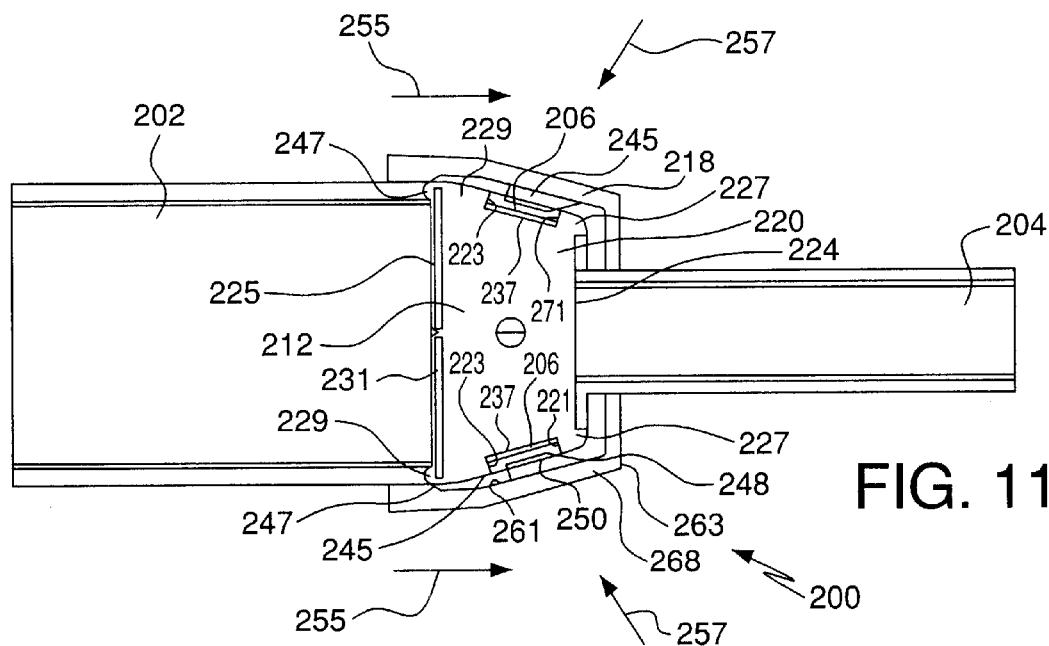
FIG. 11 is a bottom view of the raceway fitting of FIG. 9, during the low temperature impact test with the cover displaced from the base.

As seen in FIGS. 9–11, each wall 266 and 268 preferably has a first protrusion or first coupling member 245 and a second protrusion 247 extending therefrom. However, each wall can have one, two or more than two protrusions extending therefrom. Since each wall is substantially similar, only wall 268 will be described herein. Wall portion 268 has an inner or first surface 261 and a substantially parallel outer or second surface 263. Each protrusion 245 extends inwardly from inner surface 261 and toward the opposite wall. The protrusion has a back surface 249, a lateral surface 251 and a tapered surface 253. The tapered surface extends from the first surface 261 at an obtuse angle and has a first end 248 and a second end 250.

Protrusion 247 is similar to protrusion 245 but is located at the second end 241 of the cover 218 and its back surface coincides with the end of the cover.

In operation the base 212 is coupled to the desired conduit and the wires are organized and inserted therein. Cover 218 is inserted over the base 212, so that protrusions 245 are inserted into the latching members 237.

To facilitate coupling, the tapered surfaces of the protrusions can engage the first edge 221 of the latching members. Due to the resilient nature of the wall portions of the cover, the wall portions will bias the protrusion against the edge 221 of the latching member 237. This biasing force will cause the edge 280 to traverse the tapered surface 253 from the first end 248 to the second end 250 and allow the protrusion 245 to be seated in the latching member and couple the base with the cover.

If as described above, the housing is struck with an outside force in the direction of arrows 255 (FIG. 11) during a low temperature impact test, the cover of the housing may "jump". If the cover "jumps", the tapered surface will traverse edge 280 from the first end 248 to about the second end 250 of tapered surface 253, at which point the biasing in the direction of arrows 257 (FIG. 11) of the wall portions will force the tapered portion back down the edge of the latching member 237 as described above.

Furthermore, each tapered portion on all four of the protrusions can function in the same way at the same time, further increasing the likelihood that the cover will resiliently snap back to the coupled configuration.

While advantageous embodiments have been chosen to illustrate the invention, it will be understood by those skilled in the art that various changes and modifications can be made therein without departing from the scope of the invention as defined in the appended claims.

What is claimed is:

1. A raceway fitting, comprising
   a first housing portion having a bottom surface, a first wall and a second wall and a first coupling member adjacent said first wall, said first coupling member having a tapered surface with first and second ends, said tapered surface extending at an obtuse angle from said first wall; and
   a second housing portion having a first side portion and a second side portion, a second coupling member on said first side portion, said second coupling member having a first edge and a second edge;
   whereby when coupling the first housing portion to said second housing portion, said first edge of said second coupling member engages said tapered surface of said first coupling member, adjacent said first end and said first edge of said second coupling member is urged along said tapered surface by a biasing force, so that said first edge of said second coupling member traverses said tapered surface in the direction of said second end, to facilitate the coupling thereof.

2. A raceway fitting according to claim 1, wherein said first coupling member is a first recess and said second coupling member is a first protrusion.

3. A raceway fitting according to claim 2, wherein said first protrusion is biased toward said second end of said tapered surface when said first protrusion initially engages said first end of said tapered surface.

4. A raceway fitting according to claim 2, further comprising
   a second recess on said second wall and a second protrusion on said second side portion.

5. A raceway fitting according to claim 4, wherein said second protrusion is biased toward a second end of a second tapered surface of said second recess when said second protrusion initially engages a first end of said second tapered surface.

6. A raceway fitting according to claim 1, wherein said tapered surface extends from said first end to said second end to define a recess.

7. A raceway fitting according to claim 1, wherein said second coupling member has a first inner wall and a second inner wall, and said tapered surface is biased against said first inner wall by at least one of said first wall and said second wall, thereby urging a portion of said tapered surface to traverse a portion of said first inner wall and facilitate the coupling of said first and second housing portions.

8. A raceway fitting according to claim 1, wherein said first wall converging with said tapered surface at said first end and said second wall converging with said tapered surface at said second end, said first end being located farther from said bottom surface than said second end.

9. A raceway fitting according to claim 1, wherein said first coupling member is a protrusion and said second coupling member is a recess, said recess having an inner wall.

10. A raceway fitting according to claim 9, wherein said protrusion has an end surface, said end surface being adjacent said first inner wall when said first and second housing portions are coupled together.

11. A raceway fitting, comprising:
    a first housing portion adapted to couple to a first mounting surface and having a bottom surface and at least one wall extending from said bottom surface, said at least one wall having a portion with a first surface having a first edge and a second surface having a second edge and an end surface proximal to said bottom surface, said first edge being located farther from said bottom surface than said second edge, and said end surface extending from said first edge to said second edge; and
    a second housing portion adapted to couple to said first housing portion and having a top portion and at least one side portion extending from said top portion, said side portion having a protrusion extending therefrom;
    whereby when coupling said second housing to said first housing, said protrusion is engages said end surface adjacent said first surface and traverses said end surface in the direction of said second surface, and said protrusion is urged along said end surface in the direction of said second surface by said at least one side portion.

12. A raceway fitting according to claim 11, wherein said end surface extends from said first wall at an obtuse angle.

13. A raceway fitting according to claim 11, wherein said protrusion has a coupling surface, said coupling surface frictionally engaging said second edge when said first and second housing portions are coupled together.

14. A raceway fitting according to claim 13, wherein said protrusion has a tapered surface, said tapered surface converging with said coupling surface to form a third edge.

15. A raceway fitting according to claim 14, wherein said third edge engages said end surface.

16. A raceway fitting according to claim 11, wherein said protrusion is biased toward said second edge by said at least one side portion when said protrusion is adjacent said first edge.

17. A raceway fitting, comprising:
    a first portion having a first wall with a recess therein, said recess having a first edge and a second edge; and
    a second portion having a second wall with a protrusion thereon, said protrusion having a first tapered surface with first and second ends, said tapered surface extending from said second wall at said second end at an oblique angle;

whereby when said second portion is being coupled to said first portion, said first edge of said recess traverses said tapered surface from said first end to said second end, so that said second end is adjacent said first edge, to facilitate the coupling of said first and second portions.

18. A raceway fitting according to claim 18, wherein said first portion has a third wall with a second recess therein, said second recess having a third edge and a fourth edge;

said second portion has a second protrusion thereon, said second protrusion having a second tapered surface with third and fourth ends, said third end of said second tapered surface contacting said third edge when said second portion is being coupled to said first portion, said second recess traversing said second tapered surface from said third end to said fourth end to facilitate the coupling of said first and second portions.

19. A raceway fitting, comprising:

a first housing member having a bottom surface and at least one side wall extending from said bottom surface, said at least one side wall having a recess with a first wall and a second wall;

a second housing member adapted to couple to said first housing member and having a top portion and at least one side portion extending therefrom; and a latching member extending from said side portion, said latching member having a tapered portion with a first end and a second end that engages a portion of said first wall of said recess when coupling said second housing to said first housing, said tapered portion being biased against said first wall by said at least one side portion, thereby urging a portion of said tapered portion to traverse said portion of said first wall from about said second end to about said first end and facilitate the coupling of said first and second housing members.

* * * * *